United States Patent
Gawith et al.

(10) Patent No.: US 8,625,189 B2
(45) Date of Patent: Jan. 7, 2014

(54) COMPENSATION FOR THE GOUY PHASE SHIFT IN QUASI-PHASE MATCHING

(75) Inventors: Corin Barry Edmund Gawith, Southampton (GB); Peter George Robin Smith, Southampton (GB); Huw Edward Major, Southampton (GB)

(73) Assignee: University of Southampton, Southampton (GB)

( * ) Notice: Subject to any disclaimer, the term of this patent is extended or adjusted under 35 U.S.C. 154(b) by 582 days.

(21) Appl. No.: 12/864,297

(22) PCT Filed: Jan. 16, 2009

(86) PCT No.: PCT/GB2009/000108
§ 371 (c)(1),
(2), (4) Date: Dec. 3, 2010

(87) PCT Pub. No.: WO2009/093004
PCT Pub. Date: Jul. 30, 2009

(65) Prior Publication Data
US 2011/0063719 A1      Mar. 17, 2011

(30) Foreign Application Priority Data
Jan. 24, 2008   (GB) .................................. 0801322.9

(51) Int. Cl.
*G02F 1/35*   (2006.01)
(52) U.S. Cl.
USPC ........................................ 359/326; 359/328
(58) Field of Classification Search
USPC ................................................ 359/326, 328
See application file for complete search history.

(56) References Cited

U.S. PATENT DOCUMENTS

| | | | |
|---|---|---|---|
| 5,193,023 | A | 3/1993 | Yamada et al. |
| 5,815,307 | A | 9/1998 | Arbore et al. |
| 6,952,307 | B2 | 10/2005 | Apostolopoulos et al. |
| 2002/0150363 | A1 | 10/2002 | Bonfrate et al. |
| 2005/0280886 | A1 | 12/2005 | Chou et al. |
| 2011/0140009 | A1* | 6/2011 | Kaertner et al. .......... 250/504 R |

FOREIGN PATENT DOCUMENTS

GB        2353397 A      2/2001

OTHER PUBLICATIONS

"Periodically poled LiNbO3: Optical parametric oscillation at wavelenghts larger than 4.0 um with strong idler absorption by focused Gaussian beam" Su et al; Journal of Applied Physics 97, 113105-1-113105-4, Jun. 2005.*
Feng et al., "Physical origin of the Gouy phase shift", Apr. 15, 2001, vol. 26, No. 8, pp. 485-487.
Boyd et al., "Parametric Interaction of Focused Gaussian Light Beams", Jul. 1968, vol. 39, No. 8, pp. 3597-3639.

(Continued)

*Primary Examiner* — Hemang Sanghavi
(74) *Attorney, Agent, or Firm* — Renner, Otto, Boisselle & Sklar, LLP

(57) ABSTRACT

A sample of nonlinear optical material for use in a nonlinear optical device contains a grating comprising alternating regions of inverted and non-inverted nonlinear coefficient of the material, with the regions separated by boundaries positioned such that the grating can provide quasi-phase matching of a selected nonlinear optical interaction, and compensate for phase mismatch arising from the Gouy phase shift of one or more focused optical beams involved in the interaction. The boundary positions can be calculated for second harmonic generation or optical parametric generation and oscillation.

25 Claims, 6 Drawing Sheets

(56) References Cited

OTHER PUBLICATIONS

International Preliminary Report on Patentability for corresponding Application No. PCT/GB2009/000108 dated Aug. 5, 2010.
Search Report for corresponding Application No. GB0801322.9 dated Jun. 2, 2008.
Xu G-D et al., "Simultaneous generation of efficient three-primary-colors by using focused Gaussian beams in an optical superlattice", Optics Communications, North-Holland Publishing Co. Amsterdam, NL, vol. 223, No. 1-3, pp. 211-218 dated Jul. 15, 2003.
R. Holzlöhner et al., "Modeling of spectral broadening in second-harmonic generation", European Southern Observatory.
Lastzka et al., "The Gouy phase shift in nonlinear interactions of waves", dated Feb. 2, 2008, pp. 1-5.
L. Gordon et al., Electronics Letters, vol. 29, p. 1942, dated Oct. 28, 1993.
L. Eyres et al., "All-epitaxial fabrication of thick, orientation-patterned GaAs films for nonlinear optical frequency conversion", Applied Physics Letters, vol. 79, No. 7, dated Aug. 13, 2001.
D.T. Reid, "Engineered quasi-phase-matching for second-harmonic generation", J. Opt. A: Pure Appl. Opt. 5, pp. S97-S102 dated 2003.

* cited by examiner

COMPENSATION FOR THE GOUY PHASE SHIFT IN QUASI-PHASE MATCHING

BACKGROUND OF THE INVENTION

The present invention relates to devices and methods for compensating for the Gouy phase shift in quasi-phase matched optical nonlinear processes.

Nonlinear optical devices are very useful for converting laser light between different wavelengths. Examples include devices for second harmonic generation (SHG) in which two photons are combined to create a new photon at twice the frequency (half the wavelength), and devices for optical parametric generation in which a single photon splits into two photons at longer wavelengths. In general, to obtain high conversion efficiencies for these interactions it is necessary to phase match the various propagating waves to allow for continuous addition of the generated light intensity. The requirement for phase matching is that the phase velocities of the interacting waves in the nonlinear material must be equal. However, the naturally occurring dispersion present in all materials means that the phase velocities (or equivalently refractive indices) will not be equal at the various wavelengths of interest. Therefore, various non-trivial schemes are used to either achieve phase matching, or to overcome the problems of imperfect phase matching. A conventional phase-matching technique makes use of birefringence in a crystalline material; birefringence and different interacting optical polarisation states can be used in combination to achieve efficient interactions.

An alternative phase matching technique is that of quasi-phase matching (QPM), in which the difference in phase velocities of the interacting waves is compensated by a periodic reversal of the nonlinear coefficient of the crystal along the propagation direction. In this scheme, the phase velocities are not equalised, but the periodic reversal of the nonlinear coefficient overcomes the deleterious effects of the absence of phase matching. The periodic reversal is commonly referred to as a grating.

A further requirement to obtain high conversion efficiency is the use of high power fundamental input beams, since nonlinear conversion efficiency is generally proportional to the square of the fundamental power. High power beams can be achieved by confinement of the beam dimensions through focusing in bulk materials, or alternatively with the use of waveguide devices. Waveguides provide an efficient route towards high conversion efficiencies even at lower fundamental input powers but, due to their limited power handling capabilities, are less suited for higher power regimes, for which bulk-focused interactions are essential.

However, for focused laser beam interactions there is an effect known as the Gouy shift [1]. This occurs with all focused optical beam interactions, and is a phase shift occurring whenever a beam passes through a focus. The phase shift causes a slight increase in the spatial frequency of phase fronts for the focused wave compared to a simple plane wave. For a single mode Gaussian beam, as is common for laser output, this position dependent phase shift is seen as a $\pi$ advancement of the phase fronts of the propagating beam as it travels from $-\infty$ to $+\infty$ through a focused waist. The effect is an inevitable consequence of focusing, and causes a slight phase mismatch whenever a focused beam is used in a nonlinear material. Thus, perfect phase matching along the length of a nonlinear device is prevented.

Previous work by Boyd and Kleinman [2] has found the conditions which provide optimal conversion efficiency under the effects of focusing in bulk nonlinear devices, by optimisation of the focusing parameter, specifically the focused Rayleigh range, and the nonlinear material length. Their analysis, for a birefringent interaction, assumes a linearly invariant device and optimises the focusing parameters accordingly, with the aim of achieving a balance between tight focusing to give a high power at the beam waist and the need to utilise as much interaction length as possible. However, with the limitation of a linearly invariant device, Boyd and Kleinman were not able to compensate for the Gouy shift. Instead they chose to optimise to a focusing value that minimises its deleterious effects on phase matching whilst attempting to maximise the benefits of tight focusing.

The optimisation provided by Boyd and Kleinman has also proven valid for focused interactions in periodic QPM grating structures. These devices are similarly linearly invariant, so that as with a birefringently phase matched device, perfect phase matching under focusing is prevented.

Hence, for both birefringent phase matching and quasi-phase matching, the Gouy phase shift is detrimental to the conversion efficiency of the nonlinear interaction. The Gouy shift is often ignored, however.

SUMMARY OF THE INVENTION

Accordingly, a first aspect of the present invention is directed to a sample of nonlinear optical material containing a grating, the grating comprising alternating regions of two different directions of a nonlinear coefficient of the material, the regions separated by boundaries positioned such that the grating can provide quasi-phase matching of a selected nonlinear optical interaction, and compensate for phase mismatch arising from the Gouy phase shift of one or more focused optical beams involved in the interaction.

It has been determined that a modification or adjustment of a standard grating for quasi-phase matching can provide compensation for the Gouy phase shift of the beams focused inside the grating. The modification is to the positions along a conventional grating at which the nonlinear coefficient periodically reverses. The positions can be determined for interactions including second harmonic generation and optical parametric generation. By compensating for the Gouy shift, significantly improved phase matching can be achieved and conversion efficiencies increased compared to those achievable from standard gratings with compensation.

In some embodiments, the nonlinear optical interaction is second harmonic generation of a single mode Gaussian focused input beam, in which case the boundaries separating the regions should be positioned according to $$\kappa(z) = \text{sgn}\left[\cos\left(\Delta k z - \arctan\left(\frac{z}{z_R}\right)\right)\right]$$

where $\kappa$ is the direction of the nonlinear coefficient; $\Delta k$ is the phase mismatch of the nonlinear optical interaction owing to the dispersion of the material; $z$ is the distance along the sample with $z=0$ at the midpoint of the sample; $z_R$ is the Rayleigh range of the focused input beam; and sgn is a mathematical function which returns +1 when its argument is positive and $-1$ when its argument is negative.

Alternatively, the nonlinear optical interaction may be optical parametric generation of a focused signal beam and a focused idler beam from a focused single mode Gaussian input pump beam, all having the same Rayleigh length, in which case the boundaries separating the regions may again be positioned according to $$\kappa(z) = \text{sgn}\left[\cos\left(\Delta kz - \arctan\left(\frac{z}{z_R}\right)\right)\right]$$

where κ is the direction of the nonlinear coefficient; Δk is the phase mismatch of the optical nonlinear interaction owing to the dispersion of the material; z is the distance along the sample with z=0 at the midpoint of the sample; $z_R$ is the Rayleigh range of the focused pump beam, the focused signal beam and the focused idler beam; and sgn is a mathematical function which returns +1 when its argument is positive and −1 when its argument is negative.

In either of the above examples, a maximum conversion efficiency can be obtained for a sample with a length L if the function $L/2z_R$ (focusing parameter) is set to be substantially 3.317.

The invention is also applicable to focused beams with higher order spatial modes. For example, the nonlinear optical interaction may generate one or more output beams from a focused Hermite-Gaussian input beam of order m, n with all focused beams in the interaction having the same Rayleigh range and sharing the same value of (m+n), in which case the boundaries separating the regions may be positioned according to $$\kappa(z) = \text{sgn}\left[\cos\left(\Delta kz - (m+n+1)\arctan\left(\frac{z}{z_R}\right)\right)\right]$$

where κ is the direction of the nonlinear coefficient; Δk is the phase mismatch of the nonlinear optical interaction owing to the dispersion of the material; z is the distance along the sample with z=0 at the midpoint of the sample; $z_R$ is the Rayleigh range of the focused beam or beams; and sgn is a mathematical function which returns +1 when its argument is positive and −1 when its argument is negative.

Alternatively, the nonlinear optical interaction may generate one or more output beams from a focused Laguerre-Gaussian input beam of order p, l with all focused beams in the interaction having the same Rayleigh range and sharing the same value of (2p+l), in which case the boundaries separating the regions may be positioned according to $$\kappa(z) = \text{sgn}\left[\cos\left(\Delta kz - (2p+l+1)\arctan\left(\frac{z}{z_R}\right)\right)\right]$$

where κ is the direction of the nonlinear coefficient; Δk is the phase mismatch of the nonlinear optical interaction owing to the dispersion of the material; z is the distance along the sample with z=0 at the midpoint of the sample; $z_R$ is the Rayleigh range of the focused beam or beams; and sgn is a mathematical function which returns +1 when its argument is positive and −1 when its argument is negative.

In a situation where the input beam is a superposition of either Hermite-Gaussian modes of order m, n or Laguerre-Gaussian modes of order p, l, an appropriate grating for Gouy phase shift compensation can be configured so as to maximise the total contribution of each mode to the overall nonlinear conversion.

In a further embodiment, the nonlinear optical interaction is optical parametric generation of a focused signal (idler) beam and an unfocused idler (signal) beam from a focused single mode Gaussian input pump beam. For such an interaction, the boundaries separating the regions can be positioned according to $$\kappa(z) = \text{sgn}\left[\left(\frac{1}{1+i\frac{z}{z_{Rp}}}\right)\left(\frac{1}{1+i\frac{z}{z_{Rs(Ri)}}}\right)e^{+ik_p z}e^{-ik_s z}e^{-ik_i z} + cc\right]$$

where the subscripts p, s and i indicate the pump beam, the signal beam and the idler beam respectively; κ is the direction of the nonlinear coefficient; k is the wave vector; z is the distance along the sample with z=0 at the midpoint of the sample; $z_R$ is the Rayleigh range of the focused beam; and sgn is a mathematical function which returns +1 when its argument is positive and −1 when its argument is negative.

For any grating configuration, the two different directions of the nonlinear coefficient may be positive and negative values, or alternatively may be a positive or negative value and zero.

A second aspect of the invention is directed to a nonlinear optical device comprising a sample of nonlinear optical material according to the first aspect, the device configured for performing the selected nonlinear optical interaction, and further comprising one or more lenses and/or mirrors arranged around the sample to provide focusing of one or more of the optical beams involved in the interaction.

Again, the nonlinear interaction may be second harmonic generation of a focused single mode Gaussian input beam, with the one or more lenses and/or mirrors providing focusing of the input beam to a Rayleigh range of $z_R$.

Alternatively, the nonlinear optical interaction may be optical parametric generation of a focused signal beam and a focused idler beam from a focused single mode Gaussian input pump beam, with the one or more lenses and/or mirrors provide focusing of the pump beam, the signal beam and the idler beam to a Rayleigh range of $z_R$.

In a further alternative, the nonlinear optical interaction may be optical parametric generation of a focused signal (idler) beam and an unfocused idler (signal) beam from a focused single mode Gaussian input pump beam, with the one or more lenses and/or mirrors provide focusing of the pump beam to a Rayleigh range $z_{Rp}$ and focusing of the signal (idler) beam) to a Rayleigh range $z_{Rs(i)}$.

A third aspect of the invention is directed to a method of fabricating a grating in a sample of nonlinear optical material, the grating comprising alternating regions of two different directions of a nonlinear coefficient of the material, the method comprising: providing a sample of nonlinear optical material having the nonlinear coefficient; selecting a nonlinear interaction to be quasi-phase matched in the sample; calculating the positions of boundaries separating the alternating regions in the grating such that the grating can provide quasi-phase matching of the selected nonlinear interaction and compensate for phase mismatch arising from the Gouy phase shift of one or more focused optical beams involved in the interaction; and forming the alternating regions in the sample.

The alternating regions may be formed by any convenient grating fabrication technique, such as electric field poling of the sample; stacking portions of the material in alternating orientations; or carrying out templated growth.

In summary, the invention relates to the design of a nonlinear phase-matching grating in such a way as to compensate for the Gouy phase mismatch, and thus enable higher efficiencies for nonlinear conversion. The use of such Gouy phase compensated quasi-phase matching can yield more symmetric temperature and wavelength tuning responses, and may lead to high conversion efficiencies before the onset of back-conversion. In optical parametric processes the invention may yield higher pump depletion, greater optical efficiency, and narrower gain bandwidth.

BRIEF DESCRIPTION OF THE DRAWINGS

For a better understanding of the invention and to show how the same may be carried into effect reference is now made by way of example to the accompanying drawings in which.

DETAILED DESCRIPTION

The present invention is concerned with compensation for the Gouy phase shift in phase matched nonlinear interactions. It has been found that compensation can be achieved by using a grating similar to the type commonly employed for quasi-phase matching. The nonlinear coefficient grating structure in the nonlinear material for providing the quasi-phase matching is modified to additionally correct or compensate for the Gouy shift, thereby increasing conversion efficiency. The modification comprises adjustment of the positions at which the nonlinear coefficient is alternated along the length of the grating.

The invention can be applied to any nonlinear material in which a quasi-phase matching grating can be formed. Examples of such materials include $LiNbO_3$, $LiTaO_3$, GaAs and KTP, but the invention is applicable to any such material, also including congruent and stoichiometric crystals, and doped materials.

A grating for quasi-phase matching in these materials takes the form of a structure in which the value of the nonlinear coefficient alternates along the propagation direction in the crystal. Conventionally, the alternation is periodic so that equal lengths of each of the two coefficient values are used. Additionally, the alternation is commonly between equal positive and negative values of the nonlinear coefficient so that the coefficient is periodically reversed along the grating, giving a +, −, +, −, +, − structure. It is also possible to achieve quasi-phase matching by periodic erasure of nonlinearity, so that the structure is +, 0, +, 0, +, 0 [3]. The present invention is applicable to either of these arrangements.

Figure 1:
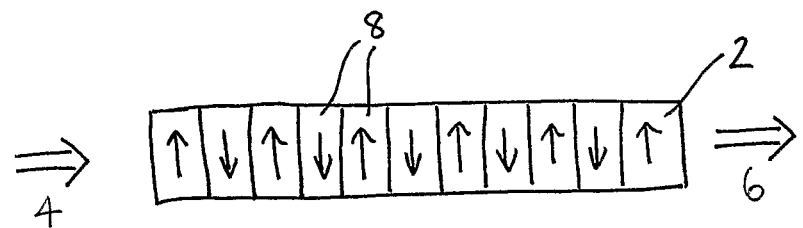
FIG. 1 shows a simplified schematic side view of a nonlinear crystal having a grating for quasi-phase matching.

FIG. 1 shows a cross-sectional schematic view through a nonlinear crystal 2 provided with a quasi-phase matching grating. The reversal of the nonlinear coefficient (indicated by the up and down arrows) at intervals along the crystal provides a grating for phase-matching of a nonlinear optical interaction of an input beam 4 of a first wavelength entering a first side of the crystal 2. The beam or beams 6 of different wavelength produced by the interaction exit the far side of the crystal 2. The grating comprises a sequence of regions of alternating nonlinearity. The present invention proposes to locate the boundaries between the regions at positions which provide compensation for the Gouy phase shift in addition to providing phase-matching for the nonlinear interaction of interest.

The grating can be made using any grating fabrication technique, examples of which include electric field poling of ferroelectric materials via electrical contacts matching the grating structure to cause inversion of the nonlinear coefficient; the bonding of stacks of material [4]; and templated growth [5].

Figure 2:
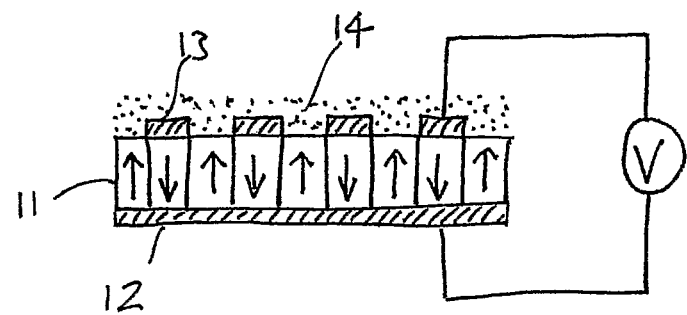
FIG. 2 shows a schematic representation of apparatus suitable for fabricating a grating such as that of FIG. 1 using electric field poling of a ferroelectric crystal.

FIG. 2 is a simplified schematic representation of a ferroelectric sample or crystal that has undergone periodic poling by application of an electric field according to an example technique. The crystal 11 has an electrode 12 continuously covering its lower face, and a patterned electrode 13 on its upper face. The patterned electrode 13 is configured as a plurality of parallel bands or stripes having widths and spacings that correspond to the desired domain inversion pattern for the grating. In accordance with the present invention, this pattern is selected for both phase matching and Gouy phase shift compensation. A layer of insulating material 14 (liquid, gas, vacuum or photoresist, for example) overlays the patterned electrode to protect the crystal between the electrode stripes. A voltage V is applied across the crystal 11 using the electrodes 12, 13. Reversal or inversion of the ferroelectric domains occurs when the applied electric field exceeds the so-called coercive field for that ferroelectric material (being a property of the material). The patterning of the upper electrode 13 means that reversal only occurs under the electrode stripes, and not under the insulated region, giving an alternating variation of the nonlinear coefficient along the crystal 11. In FIG. 1, this is indicated by the arrows in the crystal 11, which has been poled sufficiently to achieve 180° domains extending through the full depth of the crystal 11. The degree of poling achieved depends on the amount of charge delivered by the current flowing as a result of the applied electric field, so it is necessary to determine how much charge needs to be provided to produce the desired quality of poling. For a given sample, the required charge is related to the conductive area and the desired poled area defined by the patterned electrode. The amount of charge can be varied by adjustment of the applied voltage [6], the current [7], or both.

Alternative techniques may be used to provide the electrodes. In particular, the pattern may be fabricated using insulating photoresist. This may be done by spinning photoresist onto the substrate surface, exposing the photoresist using a mask to define the desired pattern and developing the photoresist to leave the unexposed parts. Hence, an insulating pattern is defined on the substrate, in place of the conducting pattern of the previous example. The conductive electrical contact is then provided over the insulating pattern, using for example a gel or liquid electrode or a metal layer, and similarly for the opposite face of the crystal. Also, many other different techniques for providing suitable electrodes for poling are known.

The upper and lower faces defined for electrical contact will depend on the crystallographic structure of the ferroelectric material being used, and also on the electrode type. For example, materials such as lithium niobate and lithium tantalite will be poled via their z faces, with the −z face typically having the patterned electrode if gel or liquid electrodes are used, and the +z face typically having the patterned electrode for metal electrodes.

Regardless of fabrication technique, the conventional quasi-phase matching grating is structured according to the particular nonlinear interaction which it is desired to phase match, by selection of an appropriate nonlinear coefficient and a suitable grating period. Other factors need to be considered when configuring the nonlinear device, including the length of the crystal, the focusing parameters for the various optical waves involved in the interaction, and, in the case of an oscillating parametric interaction, which waves will be resonated through the crystal.

Figure 3:
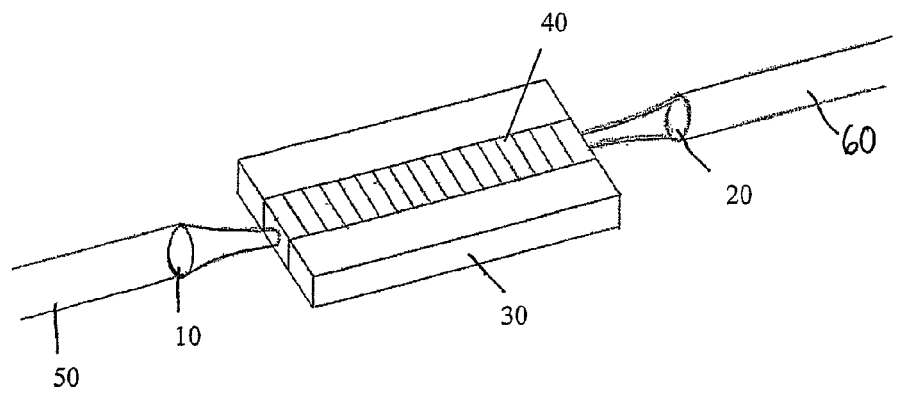
FIG. 3 shows a simplified perspective view of a quasi-phase matched focused beam second harmonic generation nonlinear optical device.

FIG. 3 shows a simplified perspective view of a conventional quasi-phase matched structure for second harmonic generation. An input laser beam (pump or fundamental beam) is focused by a first lens 10 at one end of a nonlinear crystal 30 so that a suitably sized beam waist is formed inside the crystal 30. The nonlinear crystal 30 contains a grating 40 comprising a series of periodic reversals in the nonlinear coefficient of the material along the pump propagation direction. The grating provides quasi-phase matching for a second harmonic generation nonlinear interaction for the pump wavelength, and the resulting output at the second harmonic wavelength (half the value of the pump wavelength) leaves the opposite end of the crystal 30 as a divergent beam and is collected by a second lens 20 for recollimation to provide a substantially non-divergent output beam 60.

Figure 4:
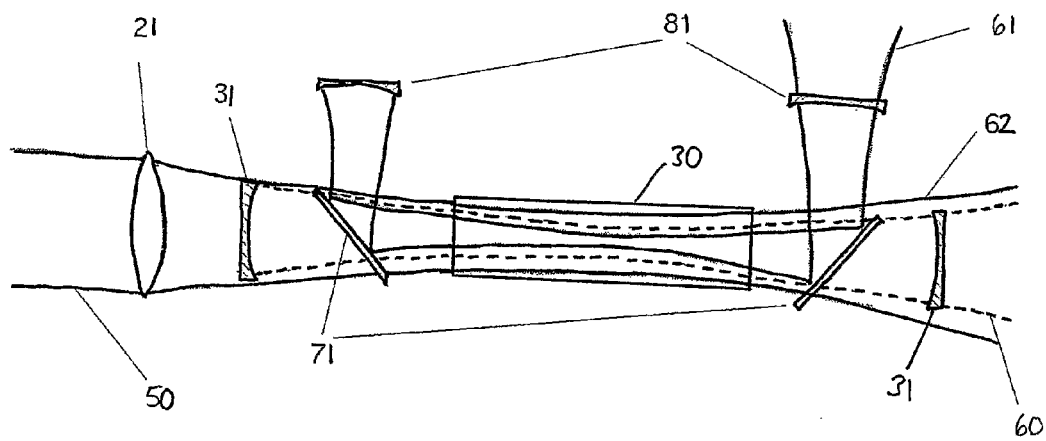
FIGS. 4 and 5 show cross-sectional schematic representations of quasi-phase matched optical parametric oscillators, respectively having equal and unequal Rayleigh ranges for the focused pump, signal and idler beams.

FIG. 4 shows a simplified cross-sectional view of an optical parametric oscillator device. In such a device, a pump or fundamental beam is converted by a nonlinear interaction into two output beams at longer wavelengths (called the signal and idler), whereby photon energy is conserved so that the combined signal and idler energies are equal to the pump energy. The input pump beam 50 is focused into the nonlinear crystal 30 (which for quasi-phase matching will contain a grating, not shown), and the signal and idler beams exit the opposite end of the device as output beams 60 and 61 respectively. In this example, the pump, the signal and the idler are all focused to have the same Rayleigh range (although note that the beam waists are different), achieved by suitable external focusing for the pump using optics 21, and resonating curved cavity mirrors and dichroic elements arranged around the crystal 30 to form independent resonant cavities for the signal and idler. In this example, the signal cavity is formed by a first pair of curved cavity mirrors 31, and the idler cavity is formed by a second pair of curved cavity mirrors 81 and a pair of dichroic mirrors 71 placed within the signal cavity. Residual pump power 62 leaves the device along with the signal beam 60.

Figure 5:
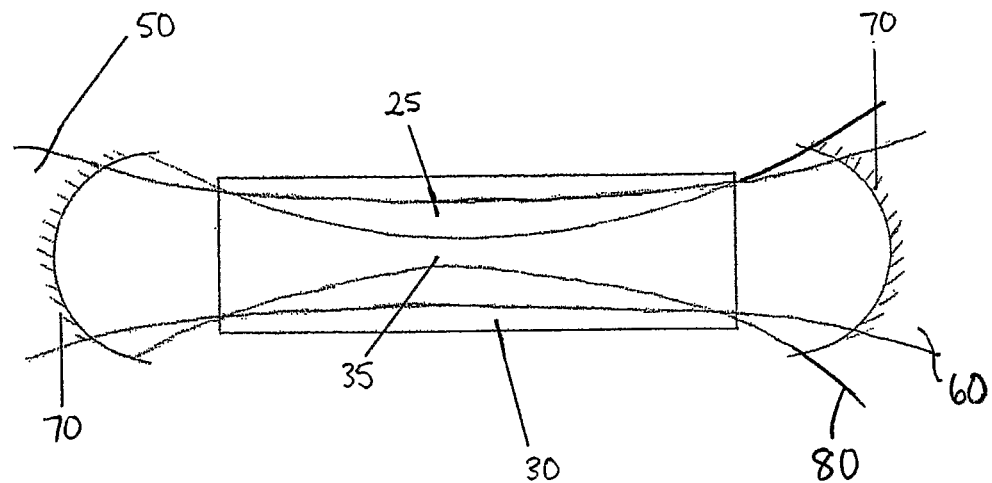

FIG. 5 shows an alternative optical parametric oscillator arrangement. In this example, the incoming pump beam 50 is focused into the crystal 30 by an external lens to have a first Rayleigh range and focused spot size (beam waist) 25 inside the crystal 30. Curved cavity mirrors 70 around the crystal 30 define a second Rayleigh range and a tighter focus (smaller beam waist) 35 for the resonated signal or idler, which leaves the device as output beam 80, together with the residual pump beam 60.

Figure 6:
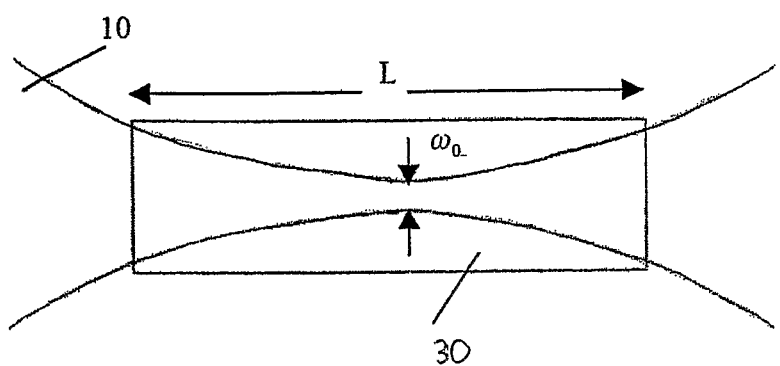
FIG. 6 illustrates a Gaussian beam focused inside a nonlinear crystal.

FIG. 6 illustrates the beam waist $\omega_0$ of a Gaussian beam 10 focused inside a nonlinear crystal 30 of length L. These parameters are relevant to the present invention.

As discussed in the above "Background of the invention", a beam focused in this way experiences the so-called Gouy phase shift, in which phase fronts of the focused beam undergo a slight increase in spatial frequency compared to a simple plane wave. For a single mode Gaussian beam, the shift is seen as a π advancement of the phase fronts for a beam propagating from between −∞ c and +∞ through a focused waist.

Figure 7:
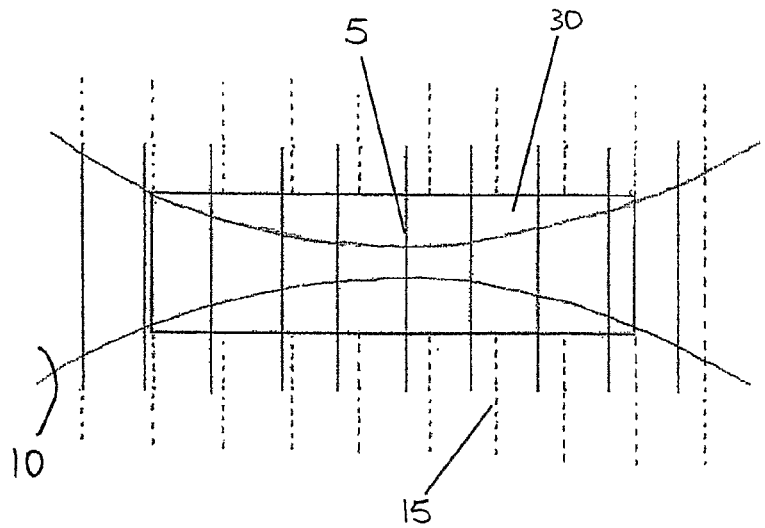
FIG. 7 shows a schematic representation of the Gouy phase shift experienced by a Gaussian beam focused inside a nonlinear crystal.

FIG. 7 illustrates the Gouy phase shift figuratively. A Gaussian beam 10 focused in a crystal 30, as in FIG. 6, has phase fronts 5 (shown as parallel solid lines) that are advanced over the phase fronts 30 (parallel dotted lines) for an idealised unfocused plane wave propagating in the same crystal. This gives an increased spatial frequency for the focused beam 10.

Figure 8:
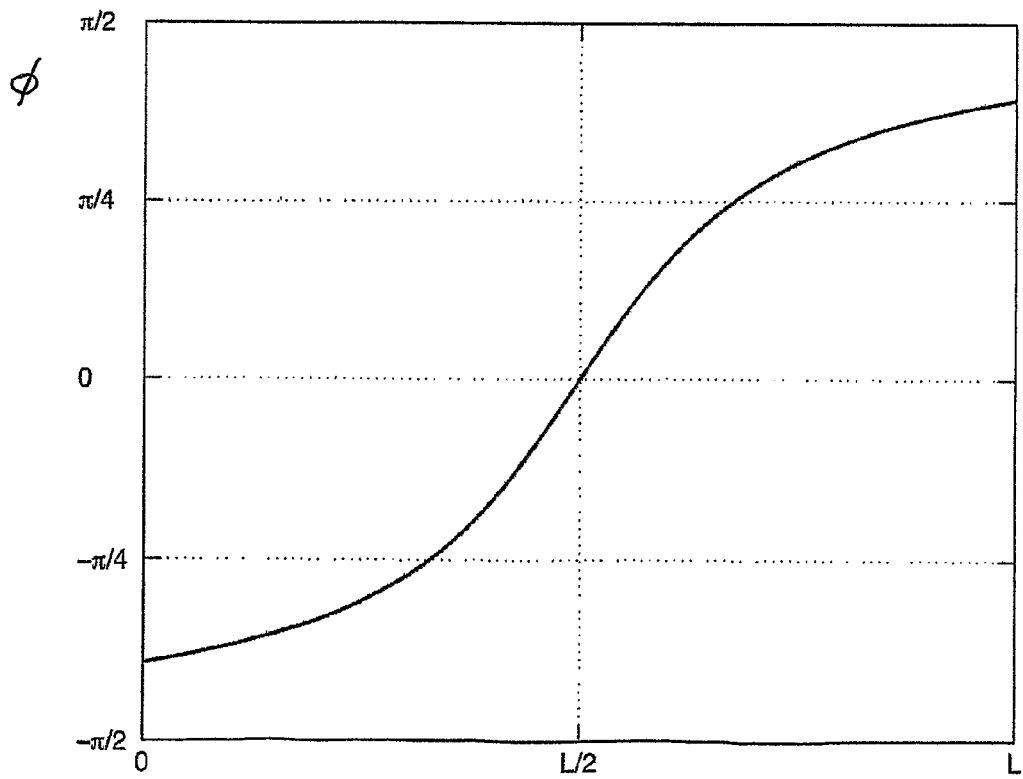
FIG. 8 shows a graph of the Gouy phase shift experienced by a Gaussian beam focused inside a nonlinear crystal.

FIG. 8, on the other hand, illustrates the Gouy shift numerically, as a plot of the variation of the phase Φ through a crystal of length L (L/2 being the midpoint of the crystal). The phase advancement of a focused Gaussian beam is shown, with the focus at L/2 and the focusing chosen for a focusing value of 2.84. The focusing value ξ is given by $L/2z_R$, $z_R$ being the Rayleigh range.

The present invention achieves compensation for the Gouy shift in a quasi-phase matched nonlinear interaction, to improve conversion efficiency.

According to an embodiment of the invention, it has been determined that for Gouy shift compensation for a single mode Gaussian beam in a second harmonic generation device, the positional variation of the nonlinearity coefficient of a crystal along the propagation direction (the grating structure) is given by $$\kappa(z) = \text{sgn}\left[\cos\left(\Delta k z - \arctan\left(\frac{z}{z_R}\right)\right)\right] \quad (1)$$

where κ is the direction of the material nonlinear coefficient, Δk is the phase mismatch of the harmonic process set by the dispersion of the material, z is the distance along the grating/crystal in the beam propagation direction (with z=0 defined as the centre of the crystal), $z_R$ is the Rayleigh range of the focused input fundamental beam and finally 'sgn' represents a mathematical function which returns only ±1, +1 when its argument is positive and −1 when negative. For second harmonic generation, $\Delta k = k_{SHG} - 2k_{fundamental}$, k being the wave vector.

Thus, the values of z for which κ changes from −1 to +1 and from +1 to −1 indicate the positions along the crystal length at which the nonlinear coefficient should alternate value to achieve Gouy shift compensation. In other words, the boundaries between the regions of different value of nonlinear coefficient that make up the grating are to be positioned at the z locations where κ changes sign. The phase-matching grating can then be fabricated in accordance with these values of z.

The Rayleigh range $z_R$ is defined as $$z_R = \frac{\pi \omega_0^2 n}{\lambda} \quad (2)$$

where $\omega_0$ is the focused spot size or beam waist at the $1/e^2$ intensity point, n is the refractive index of the material (which typically varies with wavelength and temperature), and $\lambda$ is the operating wavelength of the device (the fundamental pump wavelength).

To evaluate Equation (1) and hence determine the positions z at which the nonlinear coefficient alternates or reverses, it is necessary to select a set of parameters:
- length of the crystal, L
- fundamental (pump) wavelength
- fundamental (pump) Gaussian mode number
- operating temperature of the device Using these parameters in Equations (1) and (2), the positions of the nonlinearity reversals can be calculated for an arbitrary focusing value ($L/2z_R$). This gives a second harmonic device that is capable of perfect quasi-phase matching (no phase mismatch) under the specified focusing.

Furthermore, it has been determined that for optimal second harmonic conversion efficiency the focusing value should be selected to be 3.317. This gives a theoretical 3.5% increase in conversion efficiency over the previous best case as according to Boyd and Kleinman's analysis, which teaches a focusing value of 2.84 for maximised second harmonic conversion efficiency. Other focusing values may be used to achieve an enhancement in efficiency over uncompensated devices, however.

Figure 9:
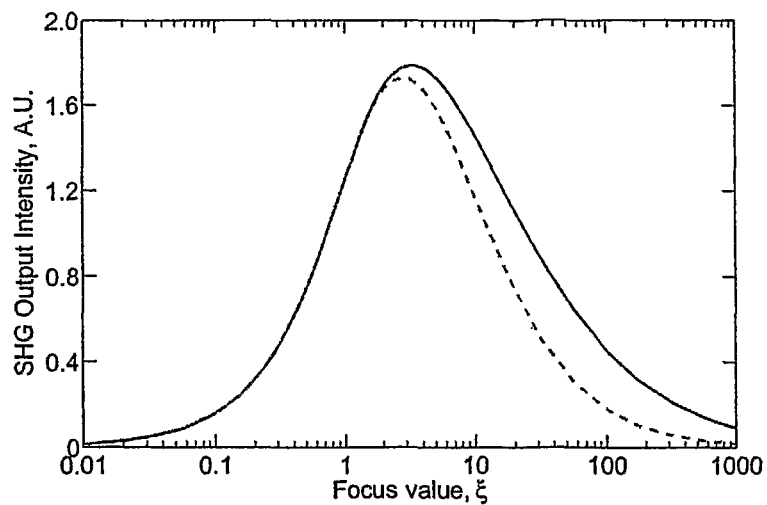
FIG. 9 shows a graph of second harmonic output intensity for a Gouy-compensated quasi-phase matched device according to an embodiment of the invention, compared to the output intensity for an uncompensated device.

FIG. 9 illustrates this improvement, as a graph of the variation of second harmonic output intensity with focusing value for a standard quasi-phase matched device (dashed line) and a Gouy-compensated device of the same length according to the present invention (solid line). The curves have been calculated using numerical integration. From this it can be seen that under any focusing condition, suitable compensation of the quasi-phase matched grating always produces a higher efficiency than from a standard quasi-phase matched device. This is especially true as the focusing value is increased towards the 2.84 value recommended by Boyd and Kleinman, where a clear increase in conversion efficiency can be observed. Also, it can be seen that the peak conversion efficiency is no longer found for a focusing value of 2.84, but has shifted to a more tightly focused value of 3.317, giving the 3.5% increase in efficiency mentioned above.

Also evident from the modelling illustrated in FIG. 9 is that for standard quasi-phase matching in a linearly invariant crystal, for focusing values greater than 2.84 the reduction in efficiency due to the Gouy phase shift outweighs the gain in average power density obtained by tighter focusing, resulting in the maximum efficiency occurring for a non-optimal power density. However, using the Gouy phase shift compensation according to the invention, the dominant effect on efficiency is now only the average power density, with the maximum average power obtained at the tighter 3.317 focusing value, giving maximum second harmonic conversion efficiency.

Further advantages of quasi-phase matching with Gouy compensation are a symmetrical $\Delta k$ tuning response and a peak $\Delta k$ value identical to that of a theoretical device operating under ideal plane wave conditions. This is in contrast to a standard quasi-phase matched device, which has an asymmetric tuning curve with a peak offset from the ideal plane wave phase matching value. This offset and the oscillations which occur at even tighter focusing are entirely due to the spatial dependence of the Gouy phase shift along the device.

Figure 10:
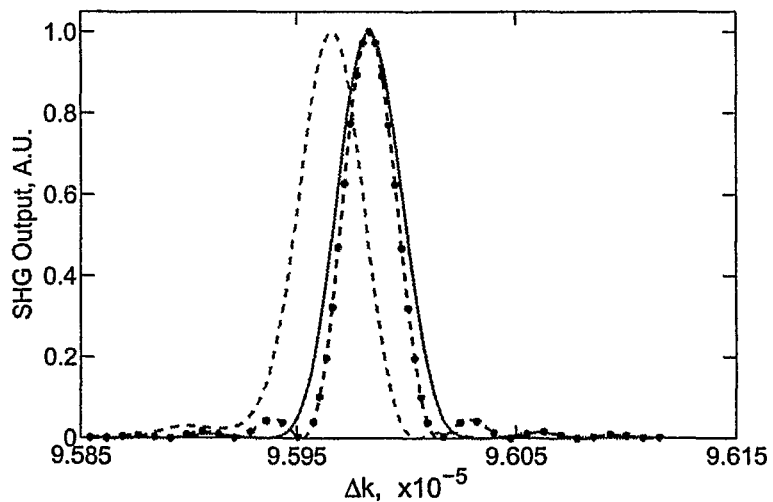
FIG. 10 shows a graph of a phase-matching tuning curve for a Gouy-compensated quasi-phase matched device according to an embodiment of the invention, compared to tuning curves for uncompensated devices.

FIG. 10 illustrates these advantages. Shown on a graph of the variation of second harmonic output with phase mismatch $\Delta k$ are curves for a standard, uncompensated quasi-phase matched device under plane wave conditions (dotted curve) and focused with a focusing value of 3.3 (dashed curve), compared with a Gouy-compensated quasi-phase matched device with a 3.3 focusing value (solid curve).

Furthermore, the use of Gouy phase shift compensation to remove phase mismatch along the crystal may also help to reduce or prevent parametric down-conversion when attempting high conversion efficiencies in second harmonic generation.

A similar approach to that discussed above for second harmonic generation yields the required grating structure for Gouy phase shift compensation in a quasi-phase matched optical parametric generation device. Here there are three separate Gaussian beams each of which is able to have a separate Rayleigh range, so the relationships between the phases of the beams are more complicated.

As for a second harmonic generation device, a set of parameters needs to be selected to enable calculation of the nonlinearity change positions. For optical parametric generation, these are:
- length of the crystal, L
- pump wavelength
- signal wavelength
- idler wavelength
- pump focused spot size
- signal focused spot size
- idler focused spot size
- operating temperature of the device In addition, there is a further design consideration relevant for optical parametric generation, which is how many of the three beams are chosen to be resonant in the cavity containing the nonlinear crystal (giving an optical parametric oscillator). This affects the Rayleigh range of each beam, upon which, as is evident from Equation (1), the nonlinearity pattern depends.

Firstly, a cavity may be chosen in which the pump, signal and idler are all arranged to have the same Rayleigh range. For such a cavity the Gouy phase shifts of all the beams will be equal, giving a particularly simple Gouy-compensated device. Accordingly, the position of the nonlinearity changes can be calculated using Equation (1), if $\Delta k$ is set to provide phase matching for the desired parametric process.

For such a device, the optimum focusing conditions for maximum conversion efficiency are again obtained for a focusing value of 3.317.

Equal Rayleigh ranges for all three beams may be achieved, for example, in a triply resonant cavity in which the pump, signal and idler are all reflected by the cavity mirrors, or in a doubly resonant cavity reflecting only two beams. For example, the signal and the idler beams may be resonated, with the Rayleigh range of the pump set through external focusing optics.

Alternatively, a singly resonant cavity may be selected, for resonance of either the signal or the idler, and external focusing for the pump. Such a cavity is common for optical parametric generation owing to its ease of use and operational stability. Compensation of the Gouy phase shift is more complicated than for doubly and triply resonant cavities, because of the lack of constraint on the idler or signal Rayleigh range (depending on which is resonated, since the cavity mirrors set the Rayleigh range for the resonated wave only), which makes necessary the phase correction of multiple beams. In a singly resonant cavity, the Rayleigh ranges of the three beams are not equal. Moreover, doubly and triply resonant cavities also may not provide equal Rayleigh ranges for all three beams.

It has been determined that, if the signal beam is resonated in a singly resonant device, the system can be compensated for Gouy phase shifting using the following formula for the positions of the nonlinearity coefficient alternations:

$$\kappa(z) = \text{sgn}\left[\left(\frac{1}{1+i\frac{z}{z_{Rp}}}\right)\left(\frac{1}{1+i\frac{z}{z_{Rs(Ri)}}}\right)e^{+ik_pz}e^{-ik_sz}e^{-ik_iz} + cc\right] \quad (3)$$

where the subscripts p, s and i indicate the pump, signal and idler respectively, and k is the wave vector for the beam indicated by the subscript. For a resonated idler beam instead, $z_{Rs}$ should be replaced with $z_{Ri}$.

Also, using this formula it is possible to calculate the location of the required nonlinearity changes for Gouy compensation in a quasi-phase matched device for any focused nonlinear interaction between three waves having arbitrary Rayleigh ranges.

For both Equation (1) and Equation (3), the positions of the nonlinearity coefficient alternations may be solved analytically. Such a calculation is complex, however, so it may be preferred to alternatively use numerical analysis. For example, numerical analysis may entail calculating the value of κ(z) at incremental steps in the z variable; for sufficiently small steps a change in the sign of κ(z) indicates the position of a nonlinearity reversal.

The above discussion has assumed that the alternation of the nonlinearity coefficient is chosen in accordance with the fundamental underlying quasi-phase matching grating period required for a particular nonlinear interaction (where the period is 2π/Δk). However, it is also possible to apply the invention to achieve Gouy compensation for a grating period corresponding to higher multiples of the fundamental period.

In order to create nonlinear materials with synthesised grating responses, it is known that alternatives to simple alternating positive and negative nonlinear regions can create desired phase matching responses [8]. The present invention is applicable to these situations and allows the use of plane wave designs with focused interactions provided an appropriate Gouy phase shift compensation is made.

Gouy compensated quasi-phase matching should be designed specifically for any particular focusing condition. It has been found that the compensation is most efficient if the beam waist is positioned in the centre of the crystal (at z=0). To consider the effects of this issue, one can examine the effect on operation of focusing at other than the focusing condition for which a grating has been designed, and of offsetting the waist from the centre of the device. The first effect is a variation in the peak Δk phase matching value.

Figure 11:
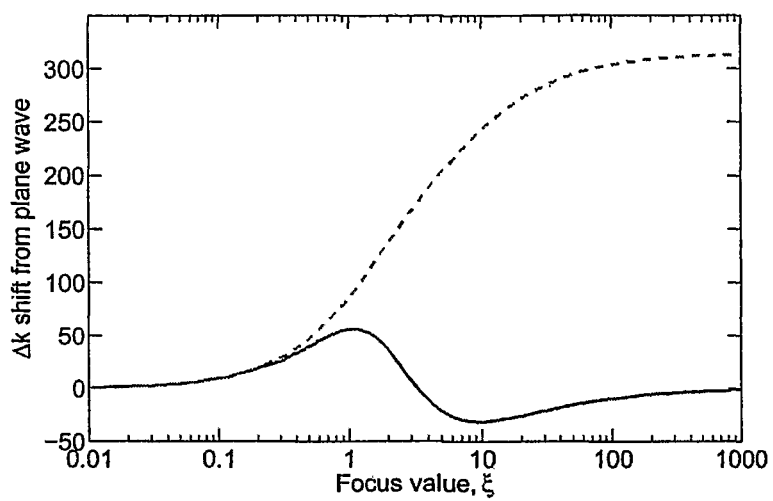
FIG. 11 shows a graph of the shift in the peak phase matching condition from an ideal plane wave case for a Gouy-compensated device according to an embodiment of the invention, compared to the shift for an uncompensated device.

FIG. 11 shows a graph of the variation of the shift of Δk from the ideal plane wave situation with focusing value ξ for second harmonic generation. The dashed curve represents a standard quasi-phase matched device, and the solid curve represents a device with Gouy compensation. From this, it can be seen that under compensated conditions, there is a complex relationship between focusing and peak phase matching value, with the Δk value initially moving away from that of the plane wave case before returning to a zero offset at optimal focus (3.317). In contrast, the peak Δk value of the standard device asymptotically approaches a large offset as the focus is tightened.

Translation of the focused beam along the propagation axis from a central location (z=0) results in an asymmetry being re-introduced into the Δk tuning curve (similar to that shown in FIG. 10) as the position-dependent phase adjustment of the grating no longer coincides with the centre of the Gouy phase shift. However, a similar effect is also seen in standard quasi-phase matching when the focal position is not central within the crystal.

It is known that the effects of Gouy phase shift are greater for optical spatial modes higher than the fundamental mode. A consequence of this is a rapidly evolving phase error between the pump beam and the grating structure, resulting in poor conversion efficiency. However, by specifically compensating for the high order Gouy phase shift large gains in efficiency should be obtained. Hence, in addition to the many improvements and advantages described above, the invention offers the possibility of harmonic and parametric generation for higher order spatial modes. For example, for a system having equal Rayleigh ranges for the focused beams, and using a focused Hermite-Gaussian pump beam of order m, n, the positions of the alternating nonlinear regions are given by $$\kappa(z) = \text{sgn}\left[\cos\left(\Delta kz - (m+n+1)\arctan\left(\frac{z}{z_R}\right)\right)\right] \quad (4)$$

Similarly, for a system with equal Rayleigh ranges that uses a focused Laguerre-Gaussian pump beam of order p, l, the positions of the alternating nonlinear regions can be found using $$\kappa(z) = \text{sgn}\left[\cos\left(\Delta kz - (2p+l+1)\arctan\left(\frac{z}{z_R}\right)\right)\right] \quad (5)$$

REFERENCES

[1] S Feng and H G Winful, Optics Letters vol 83, p 3410 (1999)
[2] G Boyd and D Kleinman, Journal of Applied Physics vol 39, p 2597 (1968)
[3] US 2002/20150363
[4] L Gordon et al, Electronics Letters vol 29, p 1942 (1993)
[5] L A Eyres et al, Applied Physics Letters vol 79(7), p 13 (2001)
[6] U.S. Pat. No. 5,193,023
[7] U.S. Pat. No. 6,952,307
[8] D T Reid, J. Opt. A: Pure Appl. Opt vol 5, pp S97-S102 (2003)

The invention claimed is:

1. A sample of nonlinear optical material containing a grating, the grating comprising alternating regions of two different directions of a nonlinear coefficient of the material, the regions separated by boundaries positioned such that the grating can provide quasi-phase matching of a selected nonlinear optical interaction, the positions of the boundaries being modified in a non-periodic manner from a periodic alternation of the nonlinear coefficient required for the quasi-phase matching so as to compensate for phase mismatch arising from the Gouy phase shift of one or more focused optical beams involved in the interaction.

2. A sample of nonlinear optical material according to claim 1, in which the nonlinear optical interaction is second harmonic generation of a focused single mode Gaussian input beam, and the boundaries separating the regions are positioned according to $$\kappa(z) = \text{sgn}\left[\cos\left(\Delta kz - \arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z=0 at the midpoint of the sample;

$z_R$ is the Rayleigh range of the focused input beam; and sgn is a mathematical function which returns +1 when its argument is positive and −1 when its argument is negative.

3. A sample of nonlinear optical material according to claim 1, in which the nonlinear optical interaction is optical parametric generation of a focused signal beam and a focused idler beam from a focused single mode Gaussian input pump beam, and the boundaries separating the regions are positioned according to $$\kappa(z) = \text{sgn}\left[\cos\left(\Delta kz - \arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z=0 at the midpoint of the sample;

$z_R$ is the Rayleigh range of the focused pump beam, the focused signal beam and the focused idler beam; and sgn is a mathematical function which returns +1 when its argument is positive and −1 when its argument is negative.

4. A sample of nonlinear optical material according to claim 2, in which the sample has a length L, and the function $L/2z_R$ equals substantially 3.317.

5. A sample of nonlinear optical material according to claim 1, in which the nonlinear optical interaction is optical parametric generation of a focused signal (idler) beam and an unfocused idler (signal) beam from a focused single mode Gaussian input pump beam, and the boundaries separating the regions are positioned according to $$\kappa(z) = \text{sgn}\left[\left(\frac{1}{1+i\frac{z}{z_{Rp}}}\right)\left(\frac{1}{1+i\frac{z}{z_{Rs(Ri)}}}\right)e^{+ik_p z}e^{-ik_s z}e^{-ik_i z} + cc\right]$$

where the subscripts p, s and i indicate the pump beam, the signal beam and the idler beam respectively;

K is the direction of the nonlinear coefficient;

k is the wave vector;

z is the distance along the sample with z=0 at the midpoint of the sample;

$z_R$ is the Rayleigh range of the focused beam; and sgn is a mathematical function which returns +1 when its argument is positive and −1 when its argument is negative.

6. A sample of nonlinear optical material according to claim 1, in which the nonlinear optical interaction generates one or more output beams from a focused Hermite-Gaussian input beam of order m, n and all focused beams in the interaction have the same Rayleigh range and the same value of (m+n), and the boundaries separating the regions are positioned according to $$\kappa(z) = \text{sgn}\left[\cos\left(\Delta kz - (m+n+1)\arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z=0 at the midpoint of the sample;

$z_R$ is the Rayleigh range of the focused beam or beams; and sgn is a mathematical function which returns +1 when its argument is positive and −1 when its argument is negative.

7. A sample of nonlinear optical material according to claim 1, in which the nonlinear optical interaction generates one or more output beams from a focused Laguerre-Gaussian input beam of order p, l and all focused beams in the interaction have the same Rayleigh range and the same value of (2p+1), and the boundaries separating the regions are positioned according to $$\kappa(z) = \text{sgn}\left[\cos\left(\Delta kz - (2p+l+1)\arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z=0 at the midpoint of the sample;

$z_R$ is the Rayleigh range of the focused beam or beams; and sgn is a mathematical function which returns +1 when its argument is positive and −1 when its argument is negative.

8. A sample of nonlinear optical material according to claim 6, in which the input beam is a superposition of modes of order m, n or p, l, and the values of (m+n) or (2p+1), the length of the sample L, and the focusing value $\xi=L/2z_R$ are such as to maximise the contribution of each mode to the conversion in the nonlinear optical interaction.

9. A sample of nonlinear optical material according to claim 1, in which the two different directions of the nonlinear coefficient are positive and negative values.

10. A sample of nonlinear optical material according to claim 1, in which the two different directions of the nonlinear coefficient are a positive or negative value and zero.

11. A nonlinear optical device comprising a sample of nonlinear optical material according to claim 1, the device configured for performing the selected nonlinear optical interaction, and further comprising one or more lenses and/or mirrors arranged around the sample to provide focusing of one or more of the optical beams involved in the interaction.

12. A nonlinear optical device according to claim 11, in which the nonlinear optical interaction is second harmonic generation of a focused single mode Gaussian input beam, and the boundaries separating the regions of the grating are positioned according to $$\kappa(z) = \text{sgn}\left[\cos\left(\Delta kz - \arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z=0 at the midpoint of the sample;

$z_R$ is the Rayleigh range of the focused input beam; and sgn is a mathematical function which returns +1 when its argument is positive and −1 when its argument is negative; and the one or more lenses and/or mirrors provide focusing of the input beam to the Rayleigh range of $z_R$.

13. A nonlinear optical device according to claim 11, in which the nonlinear optical interaction is optical parametric generation of a focused signal beam and a focused idler beam from a focused single mode Gaussian input pump beam, and the boundaries separating the regions of the grating are positioned according to $$\kappa(z) = \text{sgn}\left[\cos\left(\Delta k z - \arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z −0 at the midpoint of the sample;

$z_R$ is the Rayleigh range of the focused pump beam, the focused signal beam and the focused idler beam; and sgn is a mathematical function which returns +1 when its argument is positive and −1 when its argument is negative; and the one or more lenses and/or mirrors provide focusing of the pump beam, the signal beam and the idler beam to the Rayleigh range of $z_R$.

14. A nonlinear optical device according to claim 12, in which the sample has a length L, and the function $L/2z_R$ equals substantially 3.317.

15. A nonlinear optical device according to claim 11, in which the nonlinear optical interaction is optical parametric generation of a focused signal (idler) beam and an unfocused idler (signal) beam from a focused single mode Gaussian input pump beam, and the boundaries between the regions are positioned according to $$\kappa(z) = \text{sgn}\left[\left(\frac{1}{1+i\frac{z}{z_{Rp}}}\right)\left(\frac{1}{1+i\frac{z}{z_{Rs(Ri)}}}\right)e^{+ik_p z}e^{-ik_s z}e^{-ik_i z} + cc\right]$$

where the subscripts p, s and i indicate the pump beam, the signal beam and the idler beam respectively;

K is the direction of the nonlinear coefficient;

k is the wave vector;

z is the distance along the sample with z=0 at the midpoint of the sample;

$z_R$ is the Rayleigh range of the focused beam; and sgn is a mathematical function which returns +1 when its argument is positive and −1 when its argument is negative; and the one or more lenses and/or mirrors provide focusing of the pump beam to the Rayleigh range $z_{Rp}$ and focusing of the signal (idler beam) to the Rayleigh range $z_{Rs(i)}$.

16. A method of fabricating a grating in a sample of nonlinear optical material, the grating comprising alternating regions of two different directions of a nonlinear coefficient of the material, the method comprising:

providing a sample of nonlinear optical material having the nonlinear coefficient;

selecting a nonlinear interaction to be quasi-phase matched in the sample;

calculating the positions of boundaries separating the alternating regions in the grating such that the grating can provide quasi-phase matching of the selected nonlinear interaction, including modifying the positions of the boundaries in a non-periodic manner from a periodic alternation of the nonlinear coefficient required for the quasi-phase matching so as to compensate for phase mismatch arising from the Gouy phase shift of one or more focused optical beams involved in the interaction; and forming the alternating regions in the sample.

17. A method according to claim 16, in which forming the alternating regions in the sample comprises electric field poling of the sample;

stacking portions of the material in alternating orientations; or carrying out templated growth.

18. A method according to claim 16, in which the nonlinear optical interaction is second harmonic generation of a focused single mode Gaussian input beam, and the boundaries separating the regions are positioned according to $$\kappa(z) = \text{sgn}\left[\cos\left(\Delta k z - \arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z=0 at the midpoint of the sample;

$z_R$ is the Rayleigh range of the focused input beam; and sgn is a mathematical function which returns +1 when its argument is positive and −1 when its argument is negative.

19. A method according to claim 16, in which the nonlinear optical interaction is optical parametric generation of a focused signal beam and a focused idler beam from a focused single mode Gaussian input pump beam, and the boundaries separating the regions are positioned according to $$\kappa(z) = \text{sgn}\left[\cos\left(\Delta k z - \arctan\left(\frac{z}{z_R}\right)\right)\right]$$

where K is the direction of the nonlinear coefficient;

Δk is the phase mismatch of the nonlinear optical interaction owing to the dispersion of the material;

z is the distance along the sample with z=0 at the midpoint of the sample;

$z_R$ is the Rayleigh range of the focused pump beam, the focused signal beam and the focused idler beam; and sgn is a mathematical function which returns +1 when its argument is positive and −1 when its argument is negative.

20. A method according to claim 18, in which the sample has a length L, and the function $L/2z_R$ equals substantially 3.317.

21. A method according to claim 16, in which the nonlinear optical interaction generates one or more output beams from a focused Hermite-Gaussian input beam of order m, n and all focused beams have the same Rayleigh range, and the boundaries separating the regions are positioned according to $$\kappa(z) = \text{sgn}\left[\cos\left(\Delta k z - (m+n+1)\arctan\left(\frac{z}{z_R}\right)\right)\right]$$

where K is the direction of the nonlinear coefficient;
- $\Delta k$ is the phase mismatch of the nonlinear optical interaction owing to the dispersion of the material;
- z is the distance along the sample with z=0 at the midpoint of the sample;
- $z_R$ is the Rayleigh range of the focused beam or beams; and
- sgn is a mathematical function which returns +1 when its argument is positive and −1 when its argument is negative.

22. A method according to claim 16, in which the nonlinear optical interaction generates one or more output beams from a focused Laguerre-Gaussian input beam of order p, l and all focused beams have the same Rayleigh range, and the boundaries separating the regions are positioned according to $$\kappa(z) = \text{sgn}\left[\cos\left(\Delta k z - (2p+l+1)\arctan\left(\frac{z}{z_R}\right)\right)\right]$$

where K is the direction of the nonlinear coefficient;
- $\Delta k$ is the phase mismatch of the nonlinear optical interaction owing to the dispersion of the material;
- z is the distance along the sample with z=0 at the midpoint of the sample;
- $z_R$ is the Rayleigh range of the focused beam or beams; and
- sgn is a mathematical function which returns +1 when its argument is positive and −1 when its argument is negative.

23. A method according to claim 16, in which the nonlinear optical interaction is optical parametric generation of a focused signal (idler) beam and an unfocused idler (signal) beam from a focused single mode Gaussian input pump beam, and the boundaries separating the regions are positioned according to $$\kappa(z) = \text{sgn}\left[\left(\frac{1}{1+i\frac{z}{z_{Rp}}}\right)\left(\frac{1}{1+i\frac{z}{z_{Rs(R_i)}}}\right)e^{+ik_p z}e^{-ik_s z}e^{-ik_i z} + cc\right]$$

where the subscripts p, s and i indicate the pump beam, the signal beam and the idler beam respectively;
- K is the direction of the nonlinear coefficient;
- k is the wave vector;
- z is the distance along the sample with z=0 at the midpoint of the sample;
- $z_R$ is the Rayleigh range of the focused beam; and
- sgn is a mathematical function which returns +1 when its argument is positive and −1 when its argument is negative.

24. A method according to claim 16, in which the two different directions of the nonlinear coefficient are positive and negative values.

25. A method according to claim 16, in which the two different directions of the nonlinear coefficient are a positive or negative value and zero.

* * * * *

UNITED STATES PATENT AND TRADEMARK OFFICE
CERTIFICATE OF CORRECTION

| | | |
|---|---|---|
| PATENT NO. | : 8,625,189 B2 | Page 1 of 1 |
| APPLICATION NO. | : 12/864297 | |
| DATED | : January 7, 2014 | |
| INVENTOR(S) | : Corin Barry Edmund Gawith et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this
Twenty-eighth Day of April, 2015

Michelle K. Lee
*Director of the United States Patent and Trademark Office*